United States Patent
Xing et al.

(10) Patent No.: US 9,832,793 B2
(45) Date of Patent: Nov. 28, 2017

(54) METHOD FOR ACCESSING CHANNEL UNDER SPATIAL MULTIPLEXING AND STATION

(71) Applicant: ZTE CORPORATION, Guangdong (CN)

(72) Inventors: Weimin Xing, Shenzhen (CN); Nan Li, Shenzhen (CN); Kaibo Tian, Shenzhen (CN); Kaiying Lv, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 47 days.

(21) Appl. No.: 14/903,598

(22) PCT Filed: Apr. 24, 2014

(86) PCT No.: PCT/CN2014/076104
§ 371 (c)(1),
(2) Date: Jan. 8, 2016

(87) PCT Pub. No.: WO2014/173307
PCT Pub. Date: Oct. 30, 2014

(65) Prior Publication Data
US 2016/0174262 A1 Jun. 16, 2016

(30) Foreign Application Priority Data
Jul. 12, 2013 (CN) .......................... 2013 1 0292588

(51) Int. Cl.
*H04W 74/08* (2009.01)
*H04B 7/06* (2006.01)
(Continued)

(52) U.S. Cl.
CPC ...... *H04W 74/0833* (2013.01); *H04B 7/0617* (2013.01); *H04W 16/28* (2013.01); *H04W 74/08* (2013.01); *H04B 7/0452* (2013.01)

(58) Field of Classification Search
None
See application file for complete search history.

(56) References Cited

U.S. PATENT DOCUMENTS

2007/0297365 A1    12/2007  Li et al.
2010/0135319 A1*   6/2010   Wang ................ H04W 74/0875
                                                              370/445
(Continued)

FOREIGN PATENT DOCUMENTS

CN         1996908 A      7/2007
CN       103037531 A      4/2013
(Continued)

OTHER PUBLICATIONS

Deafness: A Mac Problem in Ad Hoc Networks when using Directional Antennas; Proceeding of the 12th IEEE International Conference on Network Protocols(ICNP' O4); Romit Roy Choudhury et al.XP10734830A.
(Continued)

*Primary Examiner* — Brian Roberts
(74) *Attorney, Agent, or Firm* — Ling Wu; Stephen Yang; Ling and Yang Intellectual Property

(57) ABSTRACT

The method includes: an intercepting station detecting a first radio signal of a third-party station and updating a local network allocation vector and/or response indication deferral; triggering a channel contention access procedure when determining that a second radio signal of the third-party station meets a spatial orthogonal condition, and then completing data transmission within updated time. In the case that the network allocation vector or response indication deferral is not 0, the third-party station ignoring or resetting the network allocation vector or the response indication deferral when determining that a sector transmission in a transmission initiated by the station is orthogonal with a transmission space to be carried out by itself, the third-party station initiating a contention and starting the spatial orthogonal transmission within a duration indicated by the updated network allocation vector or the response indication deferral.

20 Claims, 6 Drawing Sheets

(51) Int. Cl.
*H04W 16/28* (2009.01)
*H04B 7/0452* (2017.01)

(56) References Cited

U.S. PATENT DOCUMENTS

2011/0222408 A1* 9/2011 Kasslin ................ H04L 41/083
 370/241
2015/0016438 A1* 1/2015 Harel ................ H04W 74/0816
 370/338

FOREIGN PATENT DOCUMENTS

CN 103052077 A 4/2013
WO WO 2013/013409 * 1/2013

OTHER PUBLICATIONS

Proposed Specification Framework for TGah; IEEE P802.11; Wireless LANs; Jan. 14, 2013 doc.: IEEE 802.11-11/1137r13; Minyoung Park et al.
James Wang et al. Jan. 10, 2013; doc.: IEEE 802.11-11/0081r0; Type 0 Sectorization Scheme; (IEEE11-12-0852-00-00ah Sectorization for Hidden Node Mitigation by Huawei ); XP068040480.

* cited by examiner

METHOD FOR ACCESSING CHANNEL UNDER SPATIAL MULTIPLEXING AND STATION

TECHNICAL FIELD

The present document relates to the wireless local area network (WLAN) technology, and more particularly, to a channel access method under spatial reuse and a station thereof.

BACKGROUND OF THE RELATED ART

Currently, in the field of wireless networks, the rapid growth of wireless local area network (WLAN) has increasing demands on the WLAN applications. The Institute of Electrical and Electronics Engineers industry specifications IEEE802.11 group has defined a series of standards 802.11a/b/g/n, and subsequently other task groups appeared and were dedicated to developing specifications for improving the 802.11 technology. For example, the 802.11ah task group mainly work on below 1 GHz unlicensed bands.

In the WLAN, one access point (AP) and a number of non-AP Stations associated with the access point form into a Basic Service Set (BSS). As shown in FIG. 1, the AP1 and the STA1 consist into a BSS, and the AP2 and the STA2-STA4 consist into another BSS. When two BSS use the same channel and their signal coverage is overlapping, the two BSSs are each other's overlapping BSS (OBSS). In this spatial reuse, the WLAN uses Carrier Sense Multiple Access/Collision Avoidance (CSMA/CA) as the basic mechanism of channel access to intercept carriers before transmission and have a random backoff function, namely, it only transmits data when confirming that the channel is idle; in addition, in order to perform multiple frame exchanges, the transmission/reception parties can reserve one time period of Transmission Opportunity (TXOP) to transmit frames in order to avoid the transmission collision.

For example, as shown in FIG. 2, assuming that the AP1 wins the channel and transmits radio frames to the STA1, before transmitting the data frames, the AP1 at first initiates and transmits a Request to send (RTS) frame to the STA1 to reserve a channel, and it carries channel reservation duration information in the RTS; the STA1 responds a clear to send (CTS) frame to the AP1 to confirm the channel reservation, wherein the CTS also carries the channel reservation duration information, and the Duration information indicates that the reservation is finished at the end of TXOP. Other intercepting stations that receive the radio frame carrying the Duration information set one network allocation vector (NAV) stored by themselves, and the value of the NAV is the maximum value of the abovementioned received Duration information, within the duration indicated by the NAV, even though the physical carrier is detected as idle, the intercepting station will not send data.

The abovementioned relevant time reservation and NAV mechanism are called a virtual carrier sensing mechanism. In addition to the NAV mechanism mentioned above, the related art also defines a virtual carrier sensing mechanism using Response Indication Deferral (RID), and the radio frame that is currently being sent carries the frame type of the radio frame to be sent next, the intercepting station selects a defer time to update the value of RID according to the frame type indicated by the radio frame that is currently being sent, and the station can only contend to send when the timer of RID is 0.

In the case of using the beamforming to perform sector transmission, the related art proposes a spatial orthogonal transmission solution, generally comprising: when the intercepting station (such as the station or access point in the OBSS) determines that the sector beam transmission of current transmission and reception stations is spatially orthogonal with the data transmission to be carried out by itself, the intercepting station may cancel the previously set reservation time for virtual carrier sensing and initiate the data transmission, taking the FIG. 1 for example, assuming that the AP1 and the STA1 at first send omnidirectional radio frames or signals, for example, the RTS/CTS establishes a connection and reserves the TXOP to protect the data transmission, and then they use the beam aligned with each other to perform data transmission within the TXOP, and the AP2 or the STA3 receives omnidirectional signals from the AP1 and/or the STA1, and updates the NAV and the RID; however, the AP2 or the STA3 cannot detect that the AP1 and STA1 aligns to the sector beam with each other, then the AP2 and the STA3 can consider that their own transmissions are spatially orthogonal with the beam transmissions of the AP1 and the STA1, then the AP2 and the STA3 reset the NAV and the RID and trigger their own frame transmissions.

As an optional feature, the related sector beam transmission makes different stations have the problem of access fairness. Taking what is shown in FIG. 3 and FIG. 1 as an example, assume that the AP1 and the STA1 use the sector transmission mechanism, the AP2, the STA3 and the STA5 have the sectorization capability of determining a spatial orthogonality and triggering a transmission, and the STA4 does not have such capability; in the network structure shown in FIG. 1, the AP2 and the STA3 begin to contend to transmit when the AP1 and the STA1 use the sector beam to transmit, i.e., after the time point t1; although the STA5 has the sectorization capability, it is able to detect the sector transmission between the AP1 and the STA1, so that it has to wait until after the end of the TXOP, i.e., after the time point t2, to start contention; the STA4 does not have the sectorization capability, according to the traditional mechanism, it has to wait until after the time point t2 to contend for the channel. Using the spatial orthogonal reuse to perform wireless resource sharing should guarantee that the access or transmission of other stations that do not perform the spatial orthogonal reuse are not affected, namely the transmission of the AP2 and the STA3 in the abovementioned scenario should not affect the access of the other intercepting station. However, the related art does not define access rules for the AP2 and the STA3, the transmission between the AP2 and the STA3 may exceed the sector beam transmission duration, that is, the time point t2, shown in FIG. 3, then in fact the intercepting station such as the STA4 cannot start to contend at the time point t2 and has to wait until the transmission of the AP2 and the STA3 ends to contend for the channel, and while waiting for the transmission of the AP2 and STA3 to end, the AP1 and the STA1 probably use the spatial orthogonality to start a new transmission, and there is no doubt that this is very unfavorable and unfair for channel access of stations such as the STA4 or the STA5, and it also affects the effectiveness of data transmission of such type of stations.

SUMMARY OF THE INVENTION

The embodiment of the present invention provides a channel access method under spatial reuse and a station thereof to ensure fairness of channel access between stations at the same time of achieving a spatial reuse thus ensuring the effectiveness of data transmission of the stations.

To solve the abovementioned technical problem, the embodiment of the present invention discloses a channel access method under spatial reuse, comprising:

an intercepting station detecting a first radio signal of a third party station, updating a local network allocation vector and/or a response indication deferral;

triggering a channel contention access procedure when determining that a second radio signal of the third-party station meets a spatial orthogonal condition, and then completing a data transmission within a duration indicated after updating.

At the expiry of a timer indicated by the updated NAV or RID, the method further comprises: the intercepting station restoring the state of a random backoff procedure saved during the triggered channel contention transmission as a current random backoff procedure.

The first radio signal is a radio signal of radio frames or a part of the radio frames that can be received by the intercepting station;

the second radio signal is a radio signal of radio frames or a part of the radio frames that cannot be received by the intercepting station.

the first radio signal is transmitted in an omnidirectional mode; the second radio signal is transmitted in a directional or sectorization or beamforming mode.

Said triggering a channel contention comprises: saving the state of an existing backoff procedure; starting a new backoff procedure and contending for a channel to transmit.

said determining that a second radio signal of a third-party station meets a spatial orthogonal condition is:

not detecting the second radio signal of the third-party station within a preset time interval Δt after the end of the intercepting station detecting the first radio signal of the third-party station.

The method further comprises: the intercepting station setting a channel carrier detection result as idle.

The preset time interval Δt starts at an omnidirectional beam to sector beam conversion time point; the length of the preset time interval Δt is the duration of one or more transmission symbols; or, the length of the preset time interval Δt is the value of a summation of one short interframe space and one slot, plus the value of one receiving start delay.

When what is updated is the local network allocation vector, the duration indicated after updating is: a duration indicated by the updated local network allocation vector;

when what is updated is the response indication deferral, the duration indicated after updating is: a duration indicated by the updated response indication deferral;

when what is updated are the local network allocation vector and the response indication deferral, the duration indicated after updating is: a duration indicated by the updated local network allocation vector; or a longer one of durations indicated by the updated local network allocation vector and the updated response indication deferral.

The embodiment of the present invention further provides a station, configured to update a local network allocation vector and/or a response indication deferral when detecting a first radio signal of a third party station; trigger a channel contention access procedure when determining that a second radio signal of the third-party station meets a spatial orthogonal condition, and then complete a data transmission within a updated duration.

The station is further configured to, at the expiry of a timer indicated by the updated local network allocation vector or response indication deferral, restore the state of a random backoff procedure saved in a triggered channel contention transmission as a current random backoff procedure.

The first radio signal is a radio signal of radio frames or a part of the radio frames that can be received by the station and is sent in an omnidirectional mode;

the second radio signal is a radio signal of radio frames or a part of the radio frames that cannot be received by the station and is sent in a directional or sectorization or beamforming mode.

Said triggering a channel contention is saving the state of an existing backoff procedure; starting a new backoff procedure and contending for a channel to transmit.

Said determining that the second radio signal of the third-party station meets a spatial orthogonal condition is: not detecting the second radio signal of the third-party station within a preset time interval Δt after the end of the station detecting the first radio signal of the third-party station.

The station is further configured to set a channel carrier detection result as idle.

The preset time interval Δt starts at an omnidirectional beam to sector beam conversion time point;

the length of the preset time interval Δt is the duration of one or more transmission symbols; or, the length of the preset time interval Δt is the value of a summation of one short interframe space and one slot, plus the value of one receiving start delay.

The technical solution of the present application provides, including, an intercepting station detecting a first radio signal of a third party station, updating a local network allocation vector and/or a response indication deferral; triggering a channel contention access procedure when determining that the second radio signal of the third-party station meets a spatial orthogonal condition, and then completing the data transmission within the duration indicated after the update. In the case that the network allocation vector or the response indication deferral is not 0, the third party station ignores or resets the network allocation vector or the response indication deferral when determining that the sector transmission in the transmission initiated by the station is orthogonal with the transmission space to be carried out by itself, and initiates a contention and starts a spatial orthogonal transmission within the duration in the updated network allocation vector or response indication deferral, thus achieving the spatial reuse, ensuring the fairness of channel access between stations, and ensuring the effectiveness of data transmission of the stations.

BRIEF DESCRIPTION OF THE DRAWINGS

The accompanying drawings described herein are used to provide a further understanding of the embodiments of the present invention, and constitute a part of the present application, and exemplary embodiments of the present invention and their descriptions are used to explain the present document, and do not constitute an improper limit of the embodiments of the present invention. In the accompanying drawings.

PREFERRED EMBODIMENTS OF THE INVENTION

Figure 4:
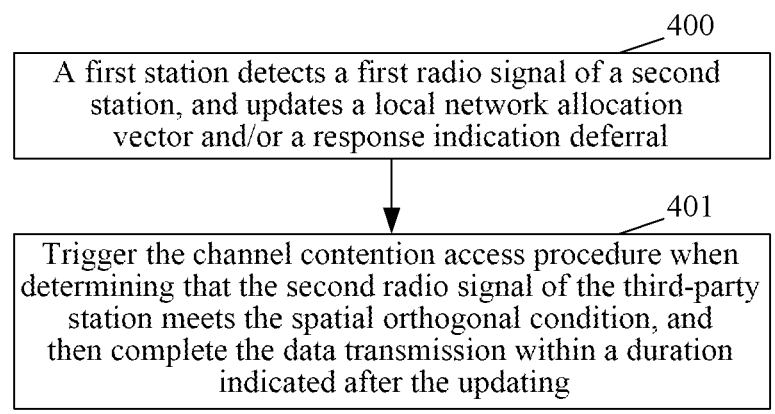
FIG. 4 is a flow chart of a channel access method under spatial reuse in accordance with an embodiment of the present invention.
Figure 5:
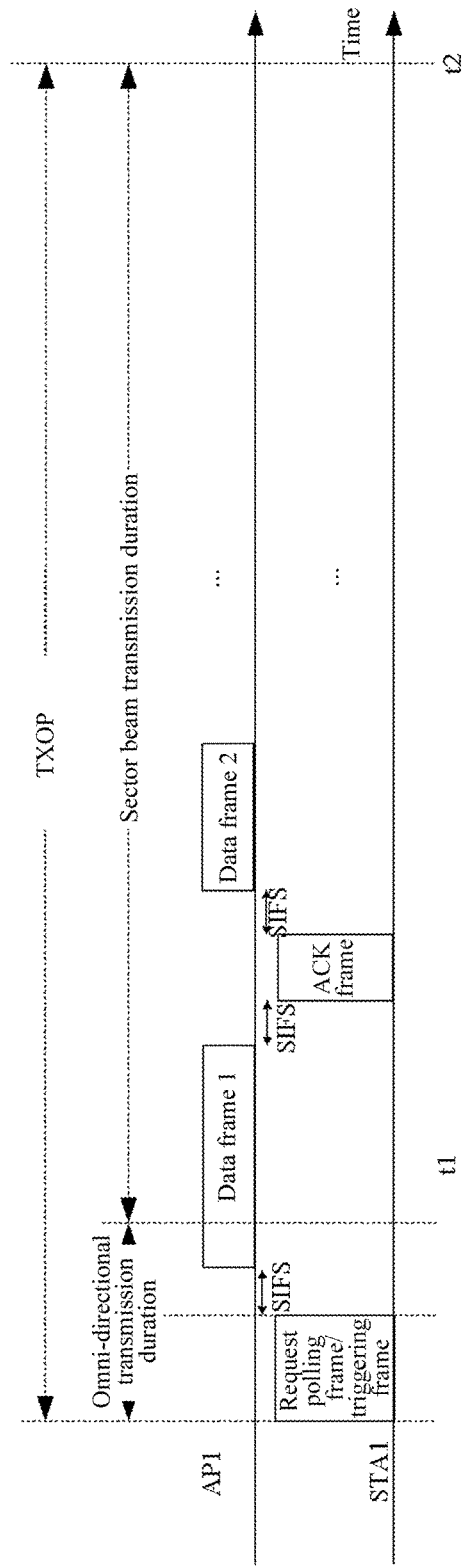
FIG. 5 is a schematic diagram of an embodiment of channel access under spatial reuse in accordance with an embodiment of the present invention.

FIG. 4 is a flow chart of a channel access method under spatial reuse in accordance with an embodiment of the present invention, as shown in FIG. 4, comprising:

in step 400: an intercepting station detects a first radio signal of a third party station, and updates a local network allocation vector and/or a response indication deferral.

The first radio signal is a radio signal of radio frames or a part of radio frames that can be received by the intercepting station and is sent in the omnidirectional mode. When the intercepting station is a non-access point station and the third-party station is an access point station, what is updated is the local network allocation vector; when the intercepting station is an access point station and the third-party station is a non-access point station, what is updated is a response indication deferral. Wherein, the update refers to that the intercepting station updates the local network allocation vector and/or the response indication deferral according to the duration indicated in the first radio signal of the third-party station, and the implementation of update is well known to those skilled in the art, and its implementation is not intended to limit the protection scope of the embodiments of the present invention.

When the intercepting station is a non-access point station and the third-party station is an access point station, prior to the present step, it further comprises: the third-party station starting to transmit a data frame, and omnidirectionally transmitting a part of a preamble sequence of the data frame header, and transmitting other parts of the data frame by using the sector beam, and the third-party station using the sector beam transmission in the remaining TXOP or access window;

when the intercepting station is an access point station and the third-party station is an non-access point station, prior to the present step, it further comprises: the third-party station receiving a data frame, omnidirectionally transmitting a part of the preamble sequence of the data frame header and the preamble comprises a response frame indication to set the value of RID of the intercepting station, and transmitting other parts of the data frame by using the sector beam, and the station that sends the data frame to the third-party station using the sector beam transmission in the remaining TXOP or access window.

The intercepting station and the third-party station may both be access stations or non-access stations.

In step 401: it is to trigger the channel contention access procedure when determining that the second radio signal of the third-party station meets the spatial orthogonal condition, and then complete the data transmission within a duration indicated after the updating.

Wherein, the second radio signal is a radio signal of radio frames or a part of the radio frames that cannot be received by the intercepting station and is sent in a directional or sectorization or beamforming mode. The updated duration is the duration indicated in the local network allocation vector or the response indication deferral updated in step 400. In the case that both the local network allocation vector and the response indication deferral are updated, the updated duration may be the duration indicated by the updated local network allocation vector, or the longer one of durations indicated by the updated local network allocation vector and the updated response indication deferral.

When the intercepting station is a non-access point station and the third-party station is an access point station, said triggering a channel contention in this step comprises: saving the state of the existing backoff procedure, such as saving the value of the backoff timer; starting a new backoff procedure and contending for a channel to transmit, the new backoff procedure can use the same contention parameters, such as interframe space and contention window, as the existing backoff procedure, or use new contention parameters; in this case, after this step, it further comprises: when the ending time point t2 indicated by the updated NAV arrives, the intercepting station restoring the saved state of backoff procedure as the backoff procedure for channel contention, such as using the saved value to restore the value of the backoff timer.

When the intercepting station is an access point station and the third-party station is a non-access point station, said triggering a channel contention in this step comprises: saving the state of the existing backoff procedure, such as saving the value of the backoff timer; starting a new backoff procedure and contending for a channel to transmit, the new backoff procedure can use the same contention parameters, such as interframe space and contention window, as the existing backoff procedure, or use new contention parameters; at this point, after this step, it further comprises: when the ending time point t2 indicated by the updated response indication deferral arrives, the intercepting station restoring the saved state of backoff procedure as the backoff procedure for channel contention, such as using the saved value to restore the value of the backoff timer.

Said determining that the second radio signal of the third-party station meets the spatial orthogonal condition in this step is: not detecting a second radio signal of the third-party station within the preset time interval $\Delta t$ after the end of the intercepting station detecting the first radio signal of the third party station. It further comprises: the intercepting station setting the channel carrier detection result as idle. Wherein, The preset time interval $\Delta t$ starts at an omnidirectional beam to sector beam conversion time point. The length of the preset time interval $\Delta t$ is the duration of one or more transmission symbols, for example, it may be one or more training sequence periods, herein the training sequence period takes a transmission symbol as the basic unit; the length of the preset time interval $\Delta t$ may be the value of a summation of one short interframe space (SIFS), one slot and the value of one receiving start delay time, wherein the SIFS is the shortest time interval between two radio frames, for example, the interval between a data frame and its response frame is a SIFS, the slot is a channel idle/busy detection slot, and the receiving start delay time is the delay time from the physical layer detecting signals of a radio frame to the MAC layer receiving the reception start indication.

From the method according to the embodiment of the present invention, it can be seen that, in the case that the network allocation vector or the response indication deferral is not 0, the intercepting station ignores or resets the network allocation vector or the response indication deferral when determining that the sector transmission in the transmission initiated by the station is orthogonal with the transmission space to be carried out by itself, and initiates a contention and starts a spatial orthogonal transmission within the duration in the updated network allocation vector or the response indication deferral, so as to achieve the spatial reuse and also ensure the fairness of channel access between the stations, thus ensuring the effectiveness of data transmission of the stations.

In the following, in conjunction with two embodiments, the method according to the embodiment of the present invention will be described in detail.

Figure 1:
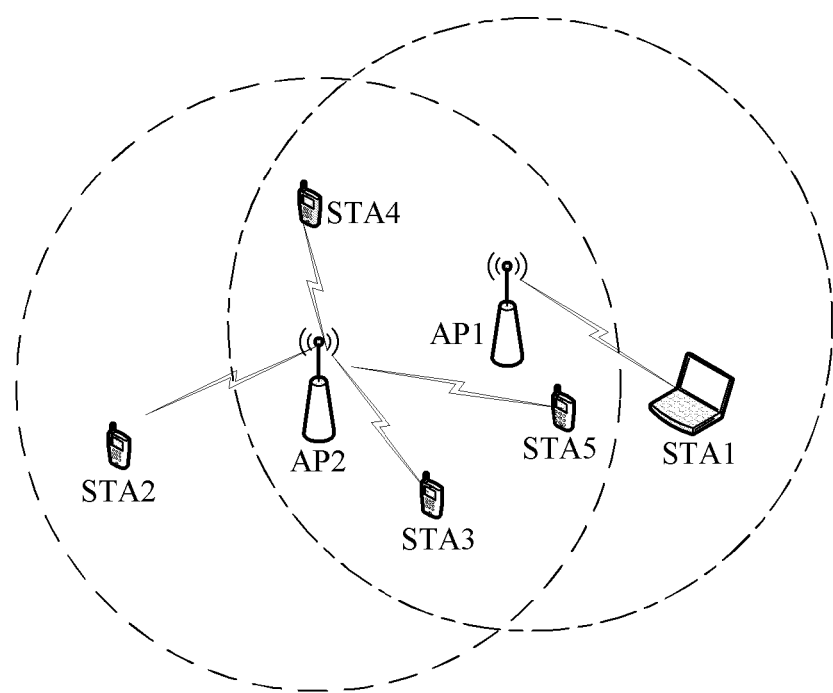
FIG. 1 is a schematic diagram of a composition structure of a BSS in a related WLAN.
Figure 2:
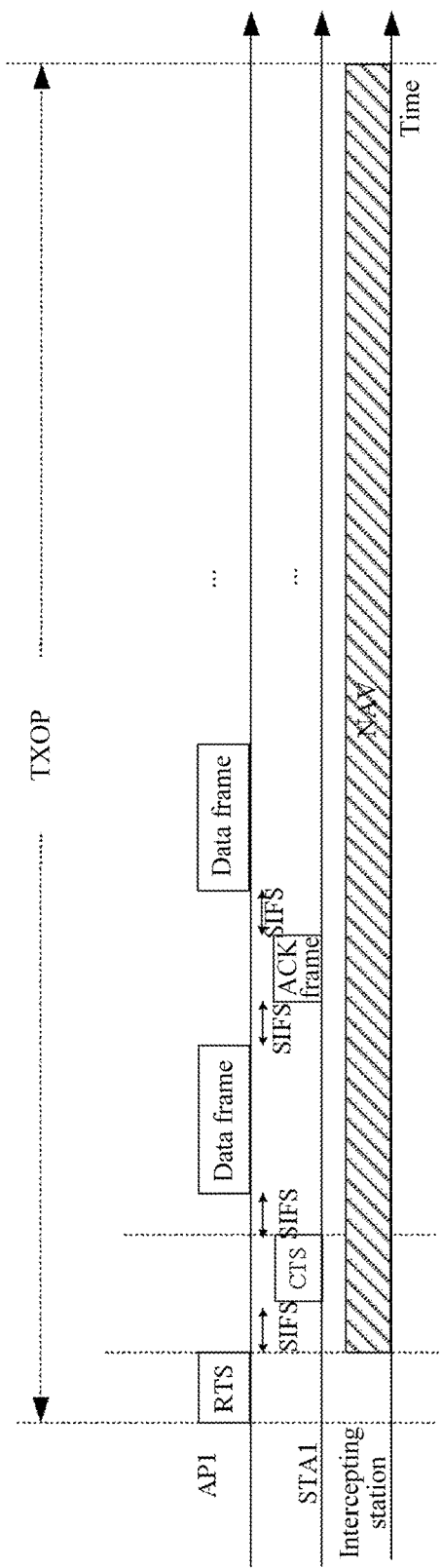
FIG. 2 is a schematic diagram of a related NAV virtual carrier sensing mechanism.

In the first embodiment, the third-party station is the AP1 and the intercepting station is the STA3. The network topology structure of the first embodiment is shown in FIG. 1, taking the case shown in FIG. 3 for example, assuming that the third-party station, that is the AP1, acquires the TXOP or one access window and omnidirectionally sends the RTS frame to the STA1, the STA1 omni-directionally transmits the CTS frame, and in the next the AP1 transmits the data frame 1, and omni-directionally transmits a part of the preamble sequence of the frame header of the data frame 1, and transmits the other parts of the data frame 1 by using the sector beam, and the AP1 uses the sector beam transmission in the remaining TXOP or access window. In actual uses, the RTS frame omnidirectionally transmitted by the AP1 and the CTS frame replied by the STA1 can be other frames transmitted omnidirectionally, such as, the data frame omnidirectionally transmitted by the AP1 and the ACK frame omnidirectionally replied by the STA1.

Figure 3:
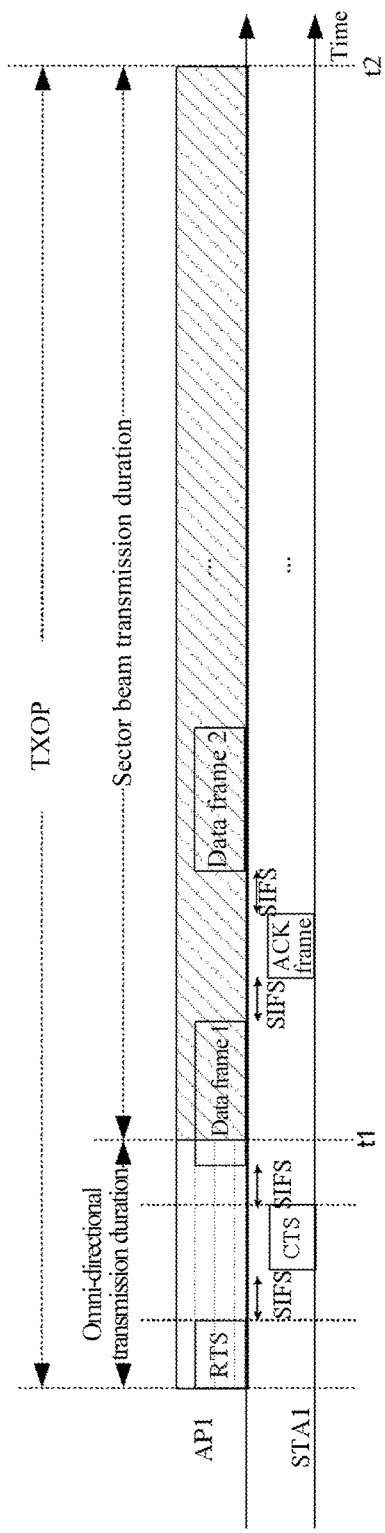
FIG. 3 is a schematic diagram of a frame exchange in a related beamforming sector transmission.

When the intercepting station, that is the STA3, intercepts the RTS frame and part of the preamble sequence of the data frame 1 (that is, part of the data frame 1 before the time point t1) omnidirectionally transmitted by the AP1, and updates the local NAV according to the omnidirectionally transmitted content, as shown in FIG. 3, assume that the ending time point of the NAV value is t2; however, the STA3 does not detect the other part of the data frame 1 or subsequent radio frames such as the data frame 2 within the preset time interval Δt after the time point t1, the STA3 determines that the sector transmission in the transmission initiated by the AP1 is orthogonal with the transmission space to be carried out by itself, at this time, the STA3 contends for a channel and initiates a transmission after the preset time interval Δt and before the ending time point t2 of the NAV value, that is, the STA3's transmission is located in the duration indicated by the updated NAV (TXOP reserved by the AP1).

Wherein, the STA3's contention access comprises: saving the state of a related backoff procedure, e.g., saving the value of the backoff timer; starting a new backoff procedure and contending for a channel to transmit, wherein the new backoff procedure may use the same contention parameters, such as interframe space and contention window, as the original backoff procedure, but it may also use new contention parameters. Therefore, after the ending time point t2 indicated by the updated NAV arrives, the STA3 restores the saved state of backoff procedure as the backoff procedure and contends for the channel, such as, using the saved value to restore the value of the backoff timer.

In related systems, when the NAV is not 0, the station cannot contend for transmission, in the embodiment of the present invention, in the abovementioned case, when the STA3 determines that the sector transmission in the transmission initiated by the AP1 is orthogonal with the transmission space to be carried out by itself, the STA3 ignores or resets the NAV and initiates a contention and starts a spatial orthogonal transmission, and the initiated transmission is within the duration indicated by the updated NAV. This ensures that all stations can still be fair to start contending for the channel access before the resetting and after the TXOP protected by the NAV ends.

In the second embodiment, the third-party station is the AP1 and the intercepting station is the AP2. The network topology structure of the second embodiment is shown in FIG. 1, taking the case shown in FIG. 4 for example, assuming that the STA1 wins the channel and omnidirectionally transmits a request polling frame or a triggering frame to the third-party station, that is, the AP1, to request the AP1 to transmit data to the STA1, and the AP1 accepts the request and transmits the data frame 1 to the STA1, and it omni-directionally transmits a part of the preamble sequence of the frame header of the data frame 1 and the preamble comprises a response frame indication to set the RID of the intercepting station (e.g. STA3, AP2 and STA5), transmitting other parts of the data frame 1 by using the sector beam, and the AP1 uses the sector beam transmission in the remaining TXOP or access window.

When the intercepting station, that is the AP2, intercepts a part of the preamble sequence of the data frame 1 (that is, part of the data frame 1 before the time point t1) of the AP1, and updates the local RID according to the omnidirectionally transmitted contents, as shown in FIG. 4, assuming that the ending time point of the RID value is t2; however, the STA3 does not detect the other part of the data frame 1 or subsequent radio frames such as the data frame 2 within the preset time interval Δt after the time point t1, the AP2 determines that the sector transmission in the transmission initiated by the AP1 is orthogonal with the transmission space to be carried out by itself, at this time, the AP2 contends for a channel and initiates a transmission after the preset time interval Δt and before the ending time point t2 of the RID value, that is, the AP2's transmission is located within the duration indicated by the updated RID (the TXOP reserved by the AP1).

Wherein, the AP2's contention access comprises: saving the state of the related backoff procedure, e.g., saving the value of the backoff timer; starting a new backoff procedure, and contending for a channel to transmit, wherein the new backoff procedure may use the same contention parameters, such as interframe space and contention window, as the original backoff procedure, or may use new contention parameters; therefore, after the ending time point t2 indicated by the updated NAV arrives, the AP2 restores the saved state of backoff procedure as the backoff procedure and contends for the channel, such as using the saved value to restore the value of the backoff timer.

In related systems, when the RID is not 0, the station cannot contend for transmission, in the embodiment of the present invention, in the abovementioned case, when the AP2 determines that the sector transmission in the transmission initiated by the AP1 is orthogonal with the transmission space to be carried out by itself, the AP2 ignores or resets the RID and initiates a contention and starts a spatial orthogonal transmission, and the initiated transmission is within the duration indicated by the updated RID. This ensures that all stations can still be fair to start contending for the channel access before the resetting and after the TXOP protected by the RID ends.

In the third embodiment, the third-party station is the AP1 and the intercepting station is the STA3. The network topology structure of the third embodiment is shown in FIG.

Figure 6:
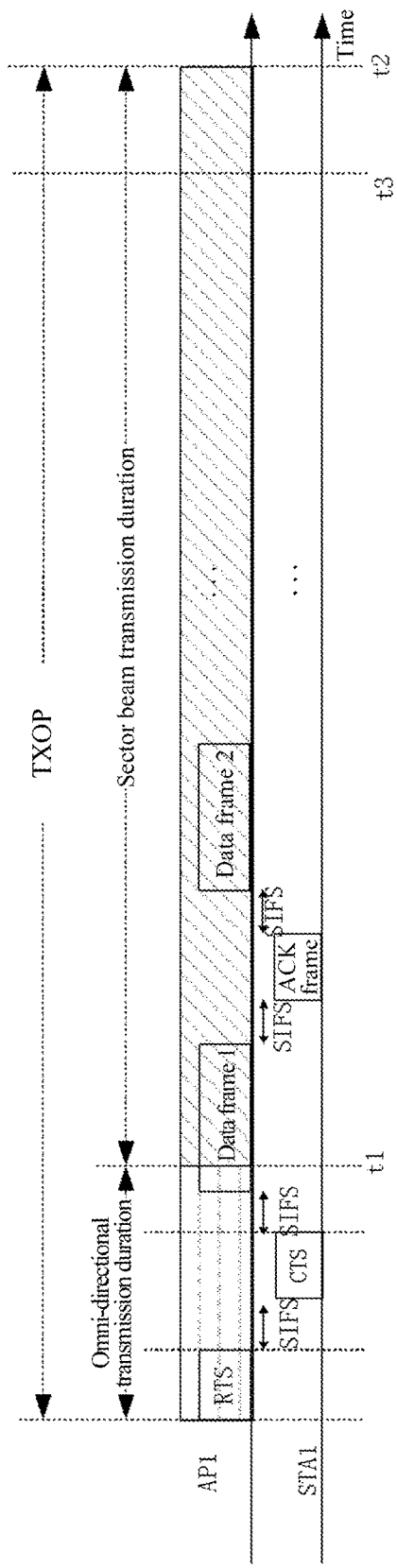
FIG. 6 is a schematic diagram of another embodiment of channel access under spatial reuse in accordance with an embodiment of the present invention.

1, and taking the case shown in FIG. 6 for example, in the present embodiment, when the intercepting station detects the first radio signal of the third party station, the local network allocation vector and the response indication deferral is updated at the same time. Assume that the third-party station, that is the AP1, acquires the TXOP or one access window and omnidirectionally transmits the RTS frame to the STA1, the STA1 omni-directionally transmits the CTS frame, in the next, the AP1 transmits the data frame 1 and omni-directionally transmits a part of the preamble sequence of the frame header of the data frame 1, and transmits other parts of the data frame 1 by using the sector beam, and the AP1 uses the sector beam transmission in the remaining TXOP or access window. In actual uses, the RTS frame omnidirectionally transmitted by the AP1 and the CTS frame replied by the STA1 can be other frames transmitted omni-directionally, such as, the data frame omnidirectionally transmitted by the AP1, or the ACK frame omnidirectionally replied by the STA1.

When the intercepting station, that is the STA3, intercepts the RTS frame and a part of the preamble sequence of the data frame 1 (that is, part of the data frame 1 before the time point t1) omnidirectionally transmitted by the AP1, and updates the local NAV according to the omni-directionally transmitted RTS contents, and updates the RID time value according to the signaling in the part of omni-directionally transmitted preamble sequence of the data frame 1, assuming that the ending time point of the NAV value is t2 and the ending time point of the RID value is t3; the NAV indication is more accurate than the RID indication; in the case that both parties are acquired, it is subject to the NAV information. If the STA3 does not detect the other part of the data frame 1 or subsequent radio frames such as the data frame 2 within the preset time interval Δt after the time point t1, the STA3 determines that the sector transmission in the transmission initiated by the AP1 is orthogonal with the transmission space to be carried out by itself, at this time, the STA3 contends for the channel and initiates a transmission after the preset time interval Δt and before the ending time point t2 of the NAV value, that is, the STA3's transmission is located within the duration indicated by the updated NAV (the TXOP reserved by the AP1).

Wherein, the STA3's contention access comprises: saving the state of the related backoff procedure, e.g., saving the value of the backoff timer; starting a new backoff procedure, contending for a channel to transmit, wherein the new back-off procedure may use the same contention parameters, such as interframe space and contention window, as the original backoff procedure, or may use new contention parameters. Therefore, after the ending time point t2 indicated by the updated NAV arrives, the STA3 restores the saved state of backoff procedure as the backoff procedure and contends for the channel, such as, using the saved value to restore the value of the backoff timer.

In related systems, when the NAV is not 0, the station cannot contend for transmission, in the embodiment of the present invention, in the abovementioned case, when the STA3 determines that the sector transmission in the transmission initiated by the AP1 is orthogonal with the transmission space to be carried out by itself, the STA3 ignores or resets the NAV and initiates a contention and starts a spatial orthogonal transmission, and the initiated transmission is within the duration indicated by the updated NAV. This ensures that all stations can still be fair to start contending for the channel access before the resetting and after the TXOP protected by the NAV ends.

The embodiment of the present invention further provides a station, configured to update a local network allocation vector and/or a response indication deferral when detecting a first radio signal of a third-party station; when determining that a second radio signal of the third-party station meets a spatial orthogonal condition, trigger a channel contention transmission within the updated duration.

Wherein, the first radio signal is omni-directionally transmitted radio frames or a part of the radio frames; the second radio signal is directionally or sectorization or beamforming transmitted radio frames or a part of the radio frames.

When the intercepting station is a non-access point station and the third-party station is an access point station, what is updated is the local network allocation vector; the third-party station is further configured to start to transmit a data frame, and omnidirectionally transmit a part of the preamble sequence of the data frame header, and transmit the other parts of the data frame by using the sector beam, and the third-party station uses the sector beam transmission in the remaining TXOP or access window.

When the station is an access point station and the third-party station is a non-access point station, what is updated is the response indication deferral; the third-party station is further configured to receive the data frame, wherein a part of the preamble sequence of the data frame header is omnidirectionally transmitted and the preamble comprises a response frame indication to set the RID of the intercepting station, and the other part of the data frame is transmitted by using the sector beam, and the station that sends the data frame to the third-party station uses the sector beam transmission in the remaining TXOP or the access window.

When the station is an non-access point station and the third-party station is an access point station, said triggering a channel contention is: saving the state of the existing backoff procedure, e.g., saving the value of the backoff timer; starting a new backoff procedure, contending for a channel to transmit, wherein the new back-off procedure may use the same contention parameters, such as interframe space and contention window, as the existing backoff procedure, or may use new contention parameters. At this time, the station is further configured to, when the ending time point t2 indicated by the updated NAV arrives, restore the saved state of backoff procedure as the backoff procedure and contend for the channel, such as, using the saved value to restore the value of the backoff timer.

When the station is an access point station and the third-party station is a non-access point station, said triggering a channel contention is: saving the state of the existing backoff procedure, e.g., saving the value of the backoff timer; starting a new backoff procedure, contending for a channel to transmit, wherein the new backoff procedure may use the same contention parameters, such as interframe space and contention window, as the existing backoff procedure, or may use new contention parameters. At this time, the station is further configured to, after the ending time point t2 indicated by the updated response indication deferral arrives, restore the saved state of backoff procedure as the backoff procedure and contend for the channel, such as, using the saved value to restore the value of the backoff timer.

Said determining that the second radio signal of the third-party station meets the spatial orthogonal condition is: not detecting a second radio signal of the third-party station within the preset time interval Δt after the end of the station detecting the first radio signal of the third party station. Comprising: the station sets the channel carrier detection result as idle.

The above description is only preferred embodiments of the present invention and is not intended to limit the protection scope of the embodiments of the present invention. Any modifications, equivalents and improvements made within the spirit and principle of the embodiments of the present invention should be included within the protection scope of the embodiments of the present invention.

INDUSTRIAL APPLICABILITY

The technical solution of the present application provides, including, an intercepting station detecting a first radio signal of a third party station, updating a local network allocation vector and/or a response indication deferral; triggering a channel contention access procedure when determining that the second radio signal of the third-party station meets a spatial orthogonal condition, and then completing the data transmission within the duration indicated after the updating. In the case that the network allocation vector or the response indication deferral is not 0, the third party station ignores or resets the network allocation vector or the response indication deferral when determining that the sector transmission in the transmission initiated by the station is orthogonal with the transmission space to be carried out by itself, and initiates a contention and starts a spatial orthogonal transmission within the duration in the updated network allocation vector or response indication deferral, thus achieving the spatial reuse, ensuring the fairness of channel access between stations, and ensuring the effectiveness of data transmission of the stations.

What is claimed is:

1. A channel access method under spatial reuse, comprising:
   an intercepting station detecting a first radio signal of a third-party station, updating a local network allocation vector and/or a response indication deferral;
   triggering a channel contention access procedure when determining that a second radio signal of the third-party station meets a spatial orthogonal condition, and then completing a data transmission within a duration indicated after updating.

2. The channel access method of claim 1, wherein, at the expiry of a timer indicated by the updated local network allocation vector or response indication deferral, the method further comprises: the intercepting station restoring a state of a random backoff procedure saved in a triggered channel contention access procedure as a current random backoff procedure.

3. The channel access method of claim 2, wherein, said triggering a channel contention comprises: saving a state of an existing backoff procedure; starting a new backoff procedure and contending for a channel to transmit.

4. The channel access method of claim 2, wherein, said determining that a second radio signal of a third-party station meets a spatial orthogonal condition is:
   not detecting the second radio signal of the third-party station within a preset time interval Δt after an end of the intercepting station detecting the first radio signal of the third-party station.

5. The channel access method of claim 2, wherein, the first radio signal is a radio signal of radio frames or a part of the radio frames that can be received by the intercepting station; the second radio signal is a radio signal of radio frames or a part of the radio frames that cannot be received by the intercepting station.

6. The channel access method of claim 1, wherein, the first radio signal is a radio signal of radio frames or a part of the radio frames that can be received by the intercepting station; the second radio signal is a radio signal of radio frames or a part of the radio frames that cannot be received by the intercepting station.

7. The channel access method of claim 6, wherein, the first radio signal is transmitted in an omnidirectional mode; the second radio signal is transmitted in a directional or sectorization or beamforming mode.

8. The channel access method of claim 1, wherein, said triggering a channel contention comprises: saving a state of an existing backoff procedure; starting a new backoff procedure and contending for a channel to transmit.

9. The channel access method of claim 1, wherein, said determining that a second radio signal of a third-party station meets a spatial orthogonal condition is:
   not detecting the second radio signal of the third-party station within a preset time interval Δt after an end of the intercepting station detecting the first radio signal of the third-party station.

10. The channel access method of claim 9, wherein, the method further comprises: the intercepting station setting a channel carrier detection result as idle.

11. The channel access method of claim 9, wherein, the preset time interval Δt starts at an omnidirectional beam to sector beam conversion time point;
    the length of the preset time interval Δt is a duration of one or more transmission symbols; or, the length of the preset time interval Δt is the value of a summation of one short interframe space and one slot, plus the value of one receiving start delay.

12. The channel access method of claim 1, wherein, when what is updated is the local network allocation vector, the duration indicated after updating is: a duration indicated by the updated local network allocation vector;
    when what is updated is the response indication deferral, the duration indicated after updating is: a duration indicated by the updated response indication deferral;
    when what is updated are the local network allocation vector and the response indication deferral, the duration indicated after updating is: the duration indicated by the updated local network allocation vector; or a longer one of durations indicated by the updated local network allocation vector and the updated response indication deferral.

13. A station, comprising hardware performing instructions stored in a non-transitory computer readable medium which executes steps in following modules: an updating modules, configured to, update a local network allocation vector and/or a response indication deferral when detecting a first radio signal of a third party station;
    a triggering module, configured to, trigger a channel contention access procedure when determining that a second radio signal of a third-party station meets a spatial orthogonal condition, and then complete a data transmission within updated duration.

14. The station of claim 13, wherein the hardware further performs instructions stored in a non-transitory computer readable medium which executes steps in following module:
    a restoring module, configured to, at the expiry of a timer indicated by the updated local network allocation vector or response indication deferral, restore a state of a random backoff procedure saved in a triggered channel contention transmission as a current random backoff procedure.

15. The station of claim 14, wherein, the first radio signal is a radio signal of radio frames or a part of the radio frames that can be received by the station and is sent in an omnidirectional mode;

the second radio signal is a radio signal of radio frames or a part of the radio frames that cannot be received by the station and is sent in a directional or sectorization or beamforming mode.

16. The station of claim 13, wherein, the first radio signal is a radio signal of radio frames or a part of the radio frames that can be received by the station and is sent in an omnidirectional mode;

the second radio signal is a radio signal of radio frames or a part of the radio frames that cannot be received by the station and is sent in a directional or sectorization or beamforming mode.

17. The station of claim 13, wherein, said triggering a channel contention is saving a state of an existing backoff procedure; starting a new backoff procedure and contending for a channel to transmit.

18. The station of claim 13, wherein, said determining that the second radio signal of the third-party station meets a spatial orthogonal condition is: not detecting the second radio signal of the third-party station within a preset time interval $\Delta t$ after an end of the station detecting the first radio signal of the third-party station.

19. The station of claim 18, wherein the hardware further performs instructions stored in a non-transitory computer readable medium which executes steps in following module:

a setting modul, configured to set a channel carrier detection result as idle.

20. The station of claim 18, wherein, the preset time interval $\Delta t$ starts at an omnidirectional beam to sector beam conversion time point;

the length of the preset time interval $\Delta t$ is a duration of one or more transmission symbols; or, the length of the preset time interval $\Delta t$ is the value of a summation of one short interframe space and one slot, plus the value of one receiving start delay.

* * * * *